United States Patent
Ota

(10) Patent No.: US 8,550,706 B2
(45) Date of Patent: Oct. 8, 2013

(54) TEMPERATURE MEASURING DEVICE

(75) Inventor: Koji Ota, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 942 days.

(21) Appl. No.: 12/115,735

(22) Filed: May 6, 2008

(65) Prior Publication Data

US 2008/0304547 A1 Dec. 11, 2008

(30) Foreign Application Priority Data

Jun. 11, 2007 (JP) ................................. 2007-154207

(51) Int. Cl.
- *G01K 15/00* (2006.01)
- *G01K 7/02* (2006.01)
- *G01K 7/13* (2006.01)

(52) U.S. Cl.
USPC .................. 374/181; 374/179; 374/1; 374/3; 374/163; 136/200; 702/99

(58) Field of Classification Search
USPC ............. 374/29–30, 1, 2, 100, 110, 112, 115, 374/137, 179, 166, 167, 3, 181, 182, 113; 136/200; 702/85, 99, 130, 132–136
See application file for complete search history.

(56) References Cited

U.S. PATENT DOCUMENTS

| | | | | |
|---|---|---|---|---|
| 3,099,923 A | * | 8/1963 | Benzinger | 374/113 |
| 3,825,733 A | * | 7/1974 | White et al. | 702/65 |
| 4,133,700 A | * | 1/1979 | Hollander et al. | 374/181 |
| RE30,735 E | * | 9/1981 | Ihlenfeldt et al. | 374/181 |
| 4,440,508 A | * | 4/1984 | Haloburdo et al. | 374/144 |
| 4,456,390 A | * | 6/1984 | Junkert et al. | 374/128 |
| 4,466,749 A | * | 8/1984 | Cunningham et al. | 374/134 |
| 5,056,929 A | * | 10/1991 | Watanabe et al. | 374/181 |
| 5,141,330 A | * | 8/1992 | Gregory et al. | 374/32 |
| 5,261,747 A | * | 11/1993 | Deacutis et al. | 374/137 |
| 5,288,147 A | * | 2/1994 | Schaefer et al. | 374/10 |
| 5,333,784 A | * | 8/1994 | Pompei | 236/91 C |
| 5,764,684 A | * | 6/1998 | Pompei | 374/126 |
| 5,829,876 A | * | 11/1998 | Schwartz et al. | 374/1 |
| 6,425,687 B1 | * | 7/2002 | Kulczyk | 374/115 |
| 6,793,389 B2 | * | 9/2004 | Chavan et al. | 374/179 |
| 6,902,318 B2 | * | 6/2005 | Watanabe | 374/141 |
| 6,942,382 B2 | * | 9/2005 | Demeocq | 374/179 |
| 7,841,771 B2 | * | 11/2010 | Perotti et al. | 374/179 |
| 8,188,484 B2 | * | 5/2012 | Nakano | 257/77 |
| 2008/0165827 A1 | * | 7/2008 | Lin | 374/181 |
| 2009/0168834 A1 | * | 7/2009 | Liu | 374/100 |
| 2011/0243188 A1 | * | 10/2011 | Aberra | 374/171 |
| 2012/0065923 A1 | * | 3/2012 | Whiteley | 702/130 |
| 2012/0179407 A1 | * | 7/2012 | Ge et al. | 702/99 |
| 2012/0197586 A1 | * | 8/2012 | Zhang et al. | 702/133 |
| 2013/0133710 A1 | * | 5/2013 | Ludwig | 136/200 |

FOREIGN PATENT DOCUMENTS

| | | | |
|---|---|---|---|
| JP | 57049845 A | * | 3/1982 |
| JP | 5-164628 A | | 6/1993 |
| JP | 2001-74564 A | | 3/2001 |

* cited by examiner

*Primary Examiner* — Gail Verbitsky
(74) *Attorney, Agent, or Firm* — Westerman, Hattori, Daniels & Adrian, LLP

(57) ABSTRACT

There is provided a temperature measuring device capable of achieving cost reduction even in the case where the same is a multichannel temperature measuring device. The temperature-measuring device comprises a thermocouple having two dissimilar metal wires, ends thereof, on one-side, being joined with each other, and the other ends thereof, being connected to one pair of contact terminals, respectively, a unit of a temperature-measurement set made up by joining together a plurality of the thermocouples, and a reference junction compensation circuit provided for every unit of the temperature-measurement set, wherein at least one of the reference junction compensation circuits of the temperature-measuring device is left out while the other reference junction compensation circuits of the temperature-measuring device are removed upon a plurality of the units of the temperature-measurement sets being disposed in series.

4 Claims, 9 Drawing Sheets

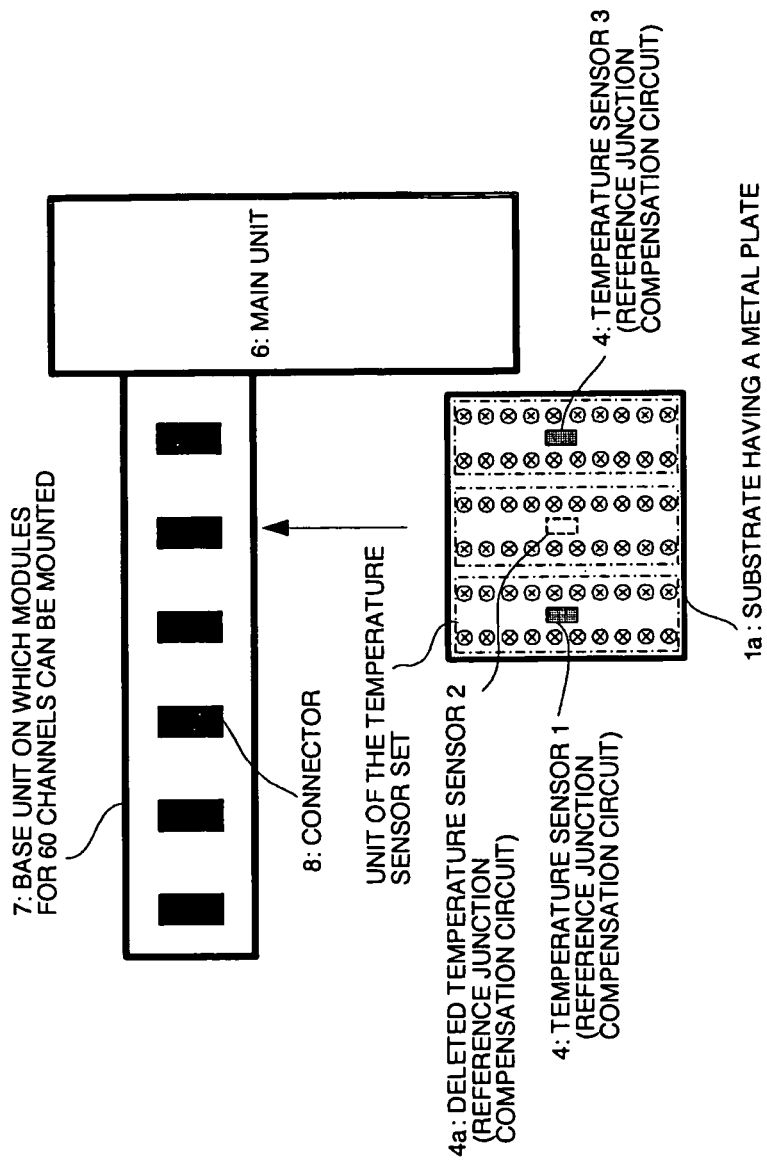

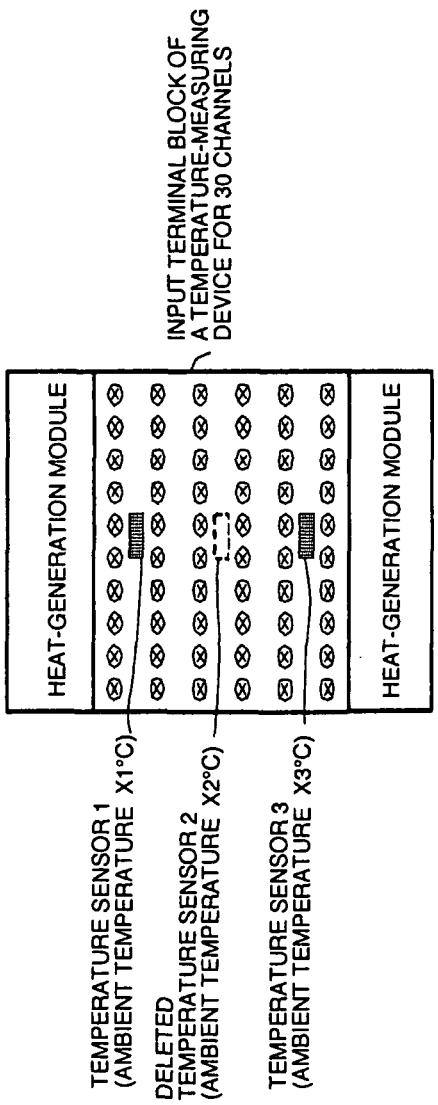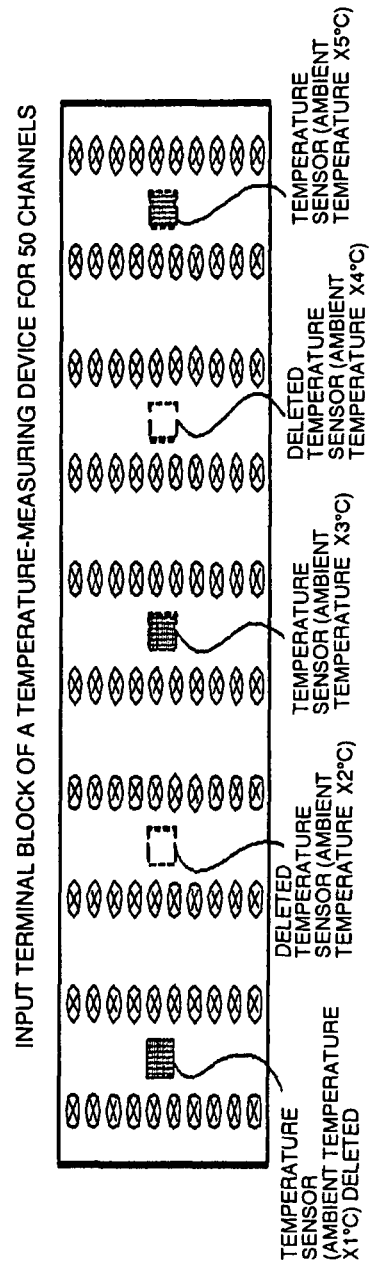

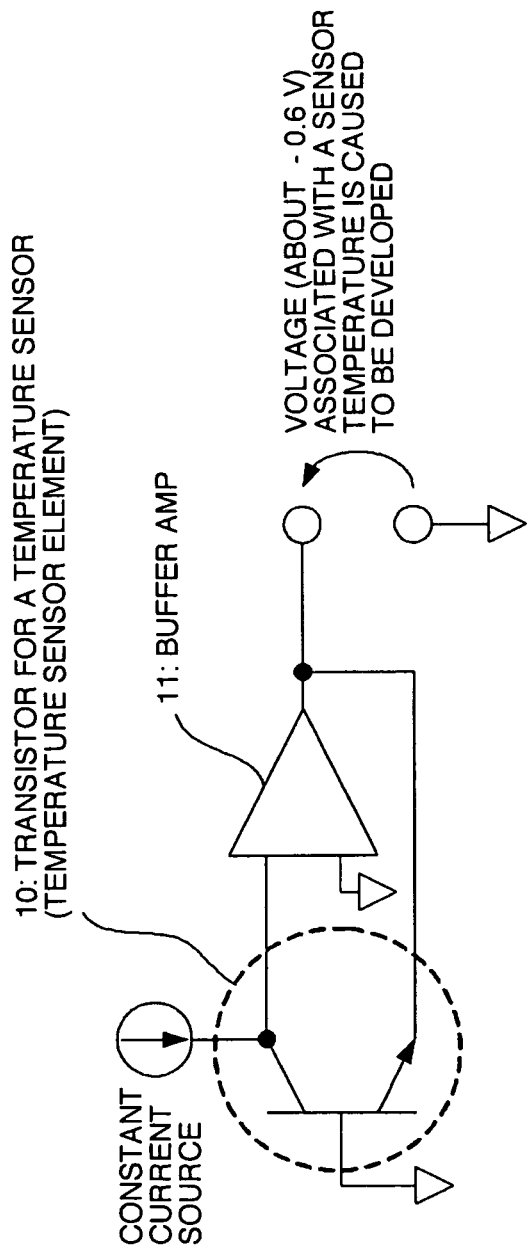

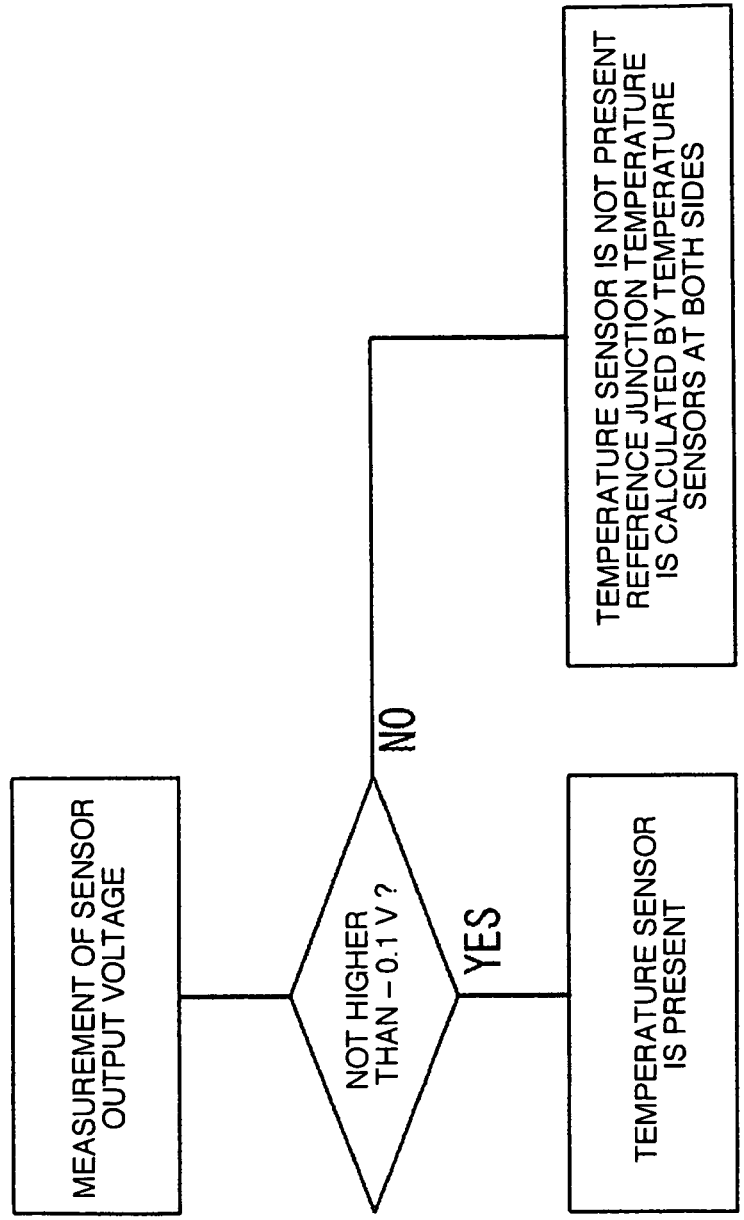

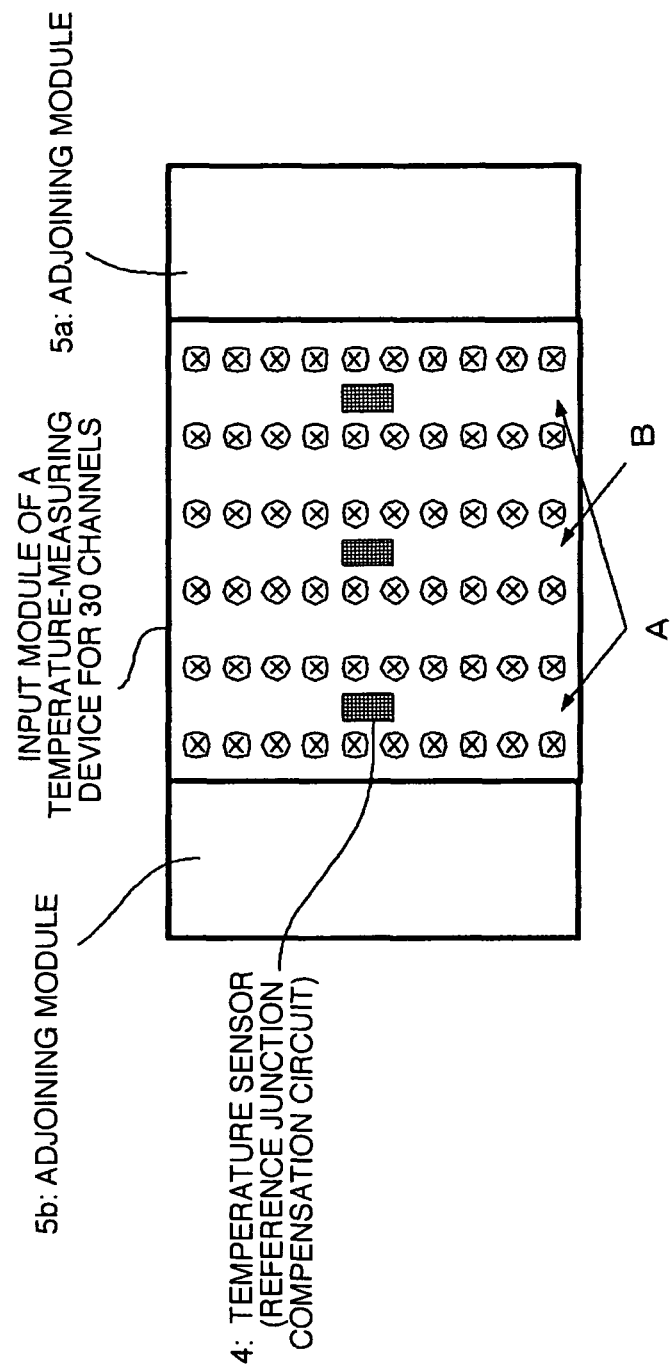

TEMPERATURE MEASURING DEVICE

FIELD OF THE INVENTION

The present invention relates to a temperature measuring device for measuring respective temperatures at multiple points by use of a thermocouple, and in particular, to a temperature measuring device intended to achieve reduction in cost by sharing a reference temperature as measured by a reference junction compensation circuit.

BACKGROUND OF THE INVENTION

A conventional instrument for measuring temperature by use of a thermocouple is provided with a terminal block to which ends of the thermocouple, on one side thereof, are connected. The terminal block is provided with a plurality of pairs of terminals to which signal lines of the thermocouple are connected, respectively, thereby feeding detection signals transmitted via the respective terminals to measurement means inside the instrument.

With this terminal block, as the number of the terminals provided increases, so does the size of a block surface, and the terminal block becomes more susceptible to external thermal effects of an environment in which the terminal block is installed. Because this can affect the detection signals transmitted via the respective terminals, there is the need for making temperature compensation for the detection signals upon measurement.

Accordingly, the terminal block is made up such that a terminal block temperature detection sensor for detecting the temperature of the terminal block itself is provided therein, and a temperature compensation signal as detected by the terminal block temperature detection sensor is fed to a compensation circuit, thereby compensating for the detection signals transmitted via the respective terminals.

As to the related art concerning a temperature-measuring device using a thermocouple, the following Patent Documents are well known.
[Patent Document 1] JP 05-164628 A
[Patent Document 2] JP 2001-74564 A FIG. 7 is a front view showing an example of an input terminal block of a temperature-measuring device capable of measuring respective temperatures of 10 channels (spots). In the figure, reference numeral 1 denotes a substrate rectangular in shape, having a metal plate, and 10 pairs of contact terminals are attached to the substrate in such a way as to be arranged in parallel in the longitudinal direction of the substrate. Reference numeral 3 denotes a thermocouple composed of two dissimilar metal wires, having ends on one side thereof, joined with each other, and the other ends connected to one pair of the contact terminals 2 (hereinafter referred to merely as terminals), respectively (in the figure, only one spot is shown). Reference numeral 4 denotes a temperature sensor constituting a reference junction compensation circuit provided substantially at the central part of the substrate 1.

FIG. 8 is a front view showing a temperature-measuring device for 30 channels, composed of 3 units of the temperature measuring devices shown in FIG. 7, disposed in series, each serving for 10 channels. That is, one unit of the temperature sensor 4 constituting the reference junction compensation circuit is installed for every 10 channels.

Now, in the case of a temperature-measuring device capable of measuring temperature with a thermocouple, there is normally the need for one unit of the temperature sensor for every channel. In reality, however, with the temperature measuring device for on the order of 10 channels, the need is met with one unit of the temperature sensor by using a substrate having a metal plate, or introducing a novel idea into a mechanical design, thereby satisfying a product specification.

FIG. 9 is a front view showing the case where a multichannel temperature-measuring device for 30 channels is incorporated in a substrate having one sheet of metal plate. In such a case, the width of the device is enlarged, so that there is a possibility of occurrence of variation in temperature distribution in the x-axis (transverse) direction of an input terminal block due to heat evolved at modules 5a, 5b, fitted to respective sides of the device. For this reason, there arises the need for one unit of the temperature sensor for every 10 channels. In the figure, regions indicated by A of input terminals, on respective sides of the input terminal block, are prone to be affected by heat evolved at the modules 5a, 5b, fitted so as to be adjoined to the respective regions A, while input terminals in a region indicated by B are subjected to the effects of heat of the input terminals, on the respective sides thereof, thereby undergoing a change, respectively.

However, there has existed a problem from the viewpoint of cost reduction in that it is difficult to achieve reduction in cost if 3 units of the temperature sensors are used for a temperature-measuring device for not less than 30 channels, as in the past case, because the temperature sensor is high in cost.

SUMMARY OF THE INVENTION

The present invention has been developed in order to solve the problem with the related art as described in the foregoing, and it is an object of the invention to provide a temperature measuring device capable of achieving cost reduction even in the case where the same is a multichannel temperature measuring device.

To that end, a temperature-measuring device according to the invention is made up as follows.

In accordance with one aspect of the invention, there is provided a temperature-measuring device comprising a thermocouple having two dissimilar metal wires, ends thereof, on one-side, being joined with each other, and the other ends thereof, being connected to one pair of contact terminals, respectively, a unit of a temperature-measurement set made up by joining together a plurality of the thermocouples, and a reference junction compensation circuit provided for every unit of the temperature-measurement set, wherein at least one of the reference junction compensation circuits of the temperature-measuring device is left out while the other reference junction compensation circuits of the temperature-measuring device are removed upon a plurality of the units of the temperature-measurement sets being disposed in series.

With the temperature-measuring device described, upon two units of the temperature-measurement sets being disposed in series, one of the reference junction compensation circuits of the temperature-measuring device may be removed.

Further, with the temperature-measuring device described, upon not less than three units of the temperature-measurement sets being disposed in series, at least one of the reference junction compensation circuits of the temperature-measuring device, positioned in-between, may be removed except for the units of the temperature-measurement sets, positioned at respective edges of the temperature-measuring device.

Still further, the plurality of the units of the temperature-measurement sets are preferably formed on one sheet of substrate provided with a metal excellent in thermal conduction.

Yet further, the reference junction compensation circuit preferably comprises a temperature sensor element, and a temperature sensor circuit, and in the case where those constituents are not used to function as the reference junction compensation circuit, the temperature sensor circuit may be left out while the temperature sensor element may be removed.

As is evident from the foregoing description, the invention has advantageous effects as follows. That is, the at least one of the reference junction compensation circuits of the temperature-measuring device is left out while the other reference junction compensation circuits of the temperature-measuring device are removed when the plurality of the units of the temperature-measurement sets are disposed in series, so that it has become possible to achieve cost reduction.

Furthermore, in the case where the temperature sensor element, and the temperature sensor circuit are not used to function as the reference junction compensation circuit, the temperature sensor circuit is left out while the temperature sensor element is removed, so that it is possible to easily restore the reference junction compensation circuit when those constituents are used as the reference junction compensation circuit.

BRIEF DESCRIPTION OF THE DRAWINGS

FIG. 1 is a front view showing an example of an input terminal block of an embodiment of a temperature-measuring device according to the invention;

FIGS. 2 (a), (b) each are a front view showing an example of an input terminal block of another embodiment of a temperature-measuring device according to the invention;

FIG. 3 is a view showing an example of a temperature sensor circuit using a transistor (temperature sensor element) serving as a reference junction compensation circuit of a thermocouple;

FIG. 4 is a flow chart showing processing for finding out whether or not the temperature sensor element according to the invention is present;

FIG. 9 is a front view showing still another example of an input terminal block of a conventional temperature-measuring device.

PREFERRED EMBODIMENTS OF THE INVENTION

Figure 5:
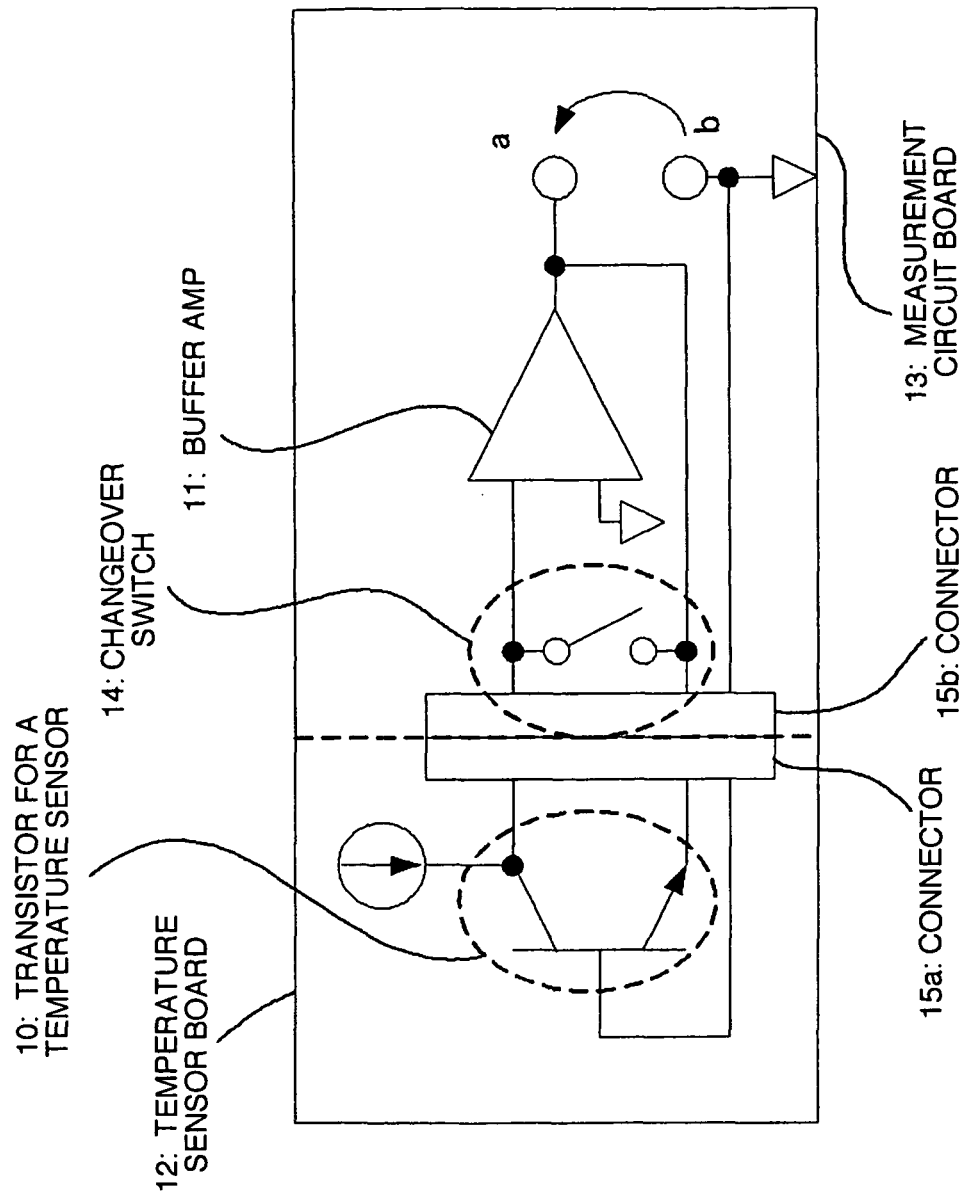
FIG. 5 is a view showing a circuit configuration of a multichannel temperature-measuring device anticipating the case where a temperature sensor is additionally installed.

FIG. 1 is a front view showing an example of an input terminal block of an embodiment of a temperature-measuring device according to the invention. In FIG. 1, reference numeral 6 denotes a main unit for collecting measurement data connected thereto. Reference numeral 7 denotes a base unit on which modules for 60 channels can be mounted, and six pieces of connectors 8 are formed. A substrate having a metal plate provided with temperature-measuring terminals for 30 channels is connected to the connector 8 via a connector (not shown).

With the present embodiment, a temperature sensor 2 corresponding to the central position among the terminals for 30 channels is dispensed with, and only a temperature sensor 1, and a temperature sensor 3 are used as the temperature sensor (reduction in the number of the temperature sensors by one unit). Further, with the present invention, 10 pairs of the terminals encircled by a dash and dotted line in FIG. 1 is defined as a unit of a temperature-measurement set. Accordingly, three units are disposed in series on the substrate shown in FIG. 1.

With the device made up as above, an ambient temperature (X1° C.) of the temperature sensor 1 is first measured with the temperature sensor 1, and subsequently, an ambient temperature (X3° C.) of the temperature sensor 3 is measured with the temperature sensor 3.

Herein, an ambient temperature (X2° C.) of the temperature sensor 2 can be presumed to be as follows:

X1° C.>the ambient temperature (X2° C.) of the temperature sensor 2>X3° C.

Provided that the ambient temperature (X1° C.) of the temperature sensor 1>the ambient temperature (X3° C.) of the temperature sensor 3.

While X1° C.<the ambient temperature (X2° C.) of the temperature sensor 2<X3° C.

provided that the ambient temperature (X1° C.) of the temperature sensor 1<the ambient temperature (X3° C.) of the temperature sensor 3.

In this connection, all the input terminals for 30 channels are disposed on the substrate having one sheet of metal plate in order to improve thermal coupling among X1, X2, and X3.

The ambient temperature (X2° C.) of the temperature sensor 2 is worked by the following computing expression:

$$X2 = X1 \times K + X3 \times (1-K)$$

where factor K is decided according to an evaluation test on each of products and a heat generation state of heat-generation modules (including the case where no heat-generation module is disposed) disposed on respective sides of the temperature-measuring device for 30 channels.

FIGS. 2 (A), (B) each are a front view showing an example of an input terminal block of another embodiment of a temperature-measuring device according to the invention. In FIG. 2 (A), there is shown the case where a temperature-measuring device for 30 channels is disposed in the longitudinal direction of a substrate, and a heat-generation module is disposed on the top, and the bottom of the temperature-measuring device for 30 channels. In this case as well, the same advantageous effect as that of the embodiment shown in FIG. 1 can be expected by dispensing with a temperature sensor 2 corresponding to the central position while leaving out temperature sensors 1, 3, that is, temperature sensors, adjacent to the top side, and the bottom side of the device, respectively.

Further, in FIG. 2 (B), there is shown the case where a temperature-measuring device for 50 channels is disposed in the transverse (the x-axis) direction of a substrate. With the present embodiment, temperature sensors 1, 5, on the respective sides of the substrate, and a temperature sensor 3 at the central part are left out while removing temperature sensors 2, 4, that is, second and fourth sensors from the leftmost sensor, respectively.

With the present embodiment, part of the temperature sensor elements of a multichannel temperature-measuring device is dispensed with in an attempt to achieve cost reduction. The specification of a product as the temperature-measuring device is naturally to be satisfied even if the number of the temperature sensors is reduced. However, there are cases where the temperature sensor as removed is required in the case of an intense change more than anticipated occurring to an ambient environment after the temperature-measuring device is installed for processing, or in order to further enhance measurement precision.

FIG. 3 shows a temperature sensor circuit using a transistor serving as a reference junction compensation circuit of a thermocouple. In the figure, a transistor (temperature sensor element) 10 has a collector connected to an inverting terminal of a buffer amp 11, and an emitter connected to an output terminal of the buffer amp 11, and a base of the transistor 10 and a noninverting terminal of the buffer amp 11 are grounded.

In FIG. 3, flow of current from the collector of the transistor 10 will cause a voltage (for example, −0.6 V) associated with a sensor temperature to be developed between the output terminal of the buffer amp 11, and the base.

FIG. 4 is a flow chart showing processing executed according to software of the multichannel temperature-measuring device, anticipating the case where a temperature sensor is additionally installed when a change in the ambient environment for the processing is more intense than anticipated beforehand, or in order to enhance measurement precision, respectively, after the temperature-measuring device is installed.

According to the flow chart, a sensor output voltage is measured, and if measurement results show that the voltage is not higher than −0.1 V (nearly 0 V), it is determined that the temperature sensor is present at the central position while if the measurement results show that the voltage is higher than −0.1 V, it is determined that the temperature sensor is not present at the central position. Then, in the case of a substrate on which the temperature sensor corresponding to the central position among terminals for 30 channels is dispensed with, a reference junction temperature of the temperature sensor corresponding to the central position is worked out by the computing expression previously described as follows:

$$X2 = X1 \times K + X3 \times (1-K)$$

Figure 6:
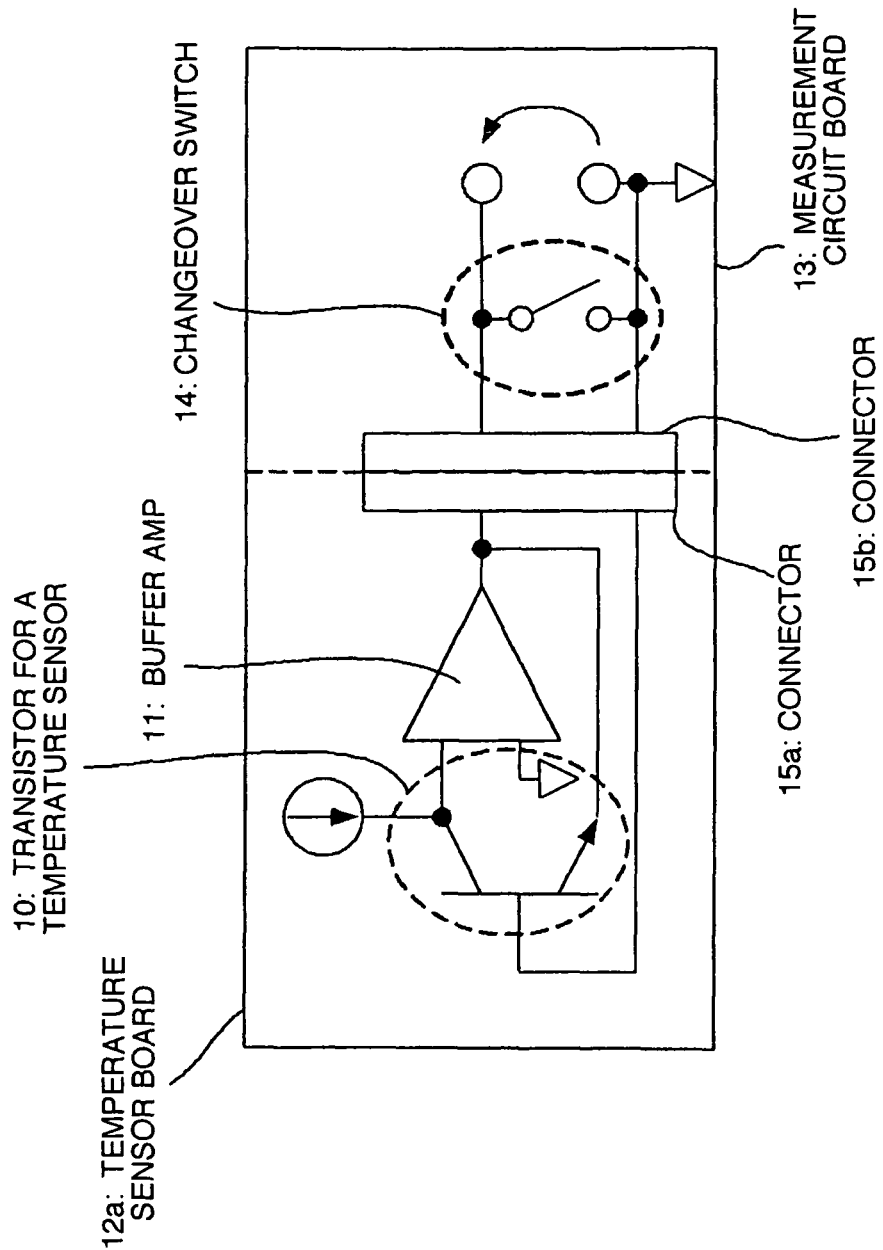
FIG. 6 is a view showing a circuit configuration of another embodiment of a multichannel temperature-measuring device anticipating the case where the temperature sensor is additionally installed.
Figure 7:
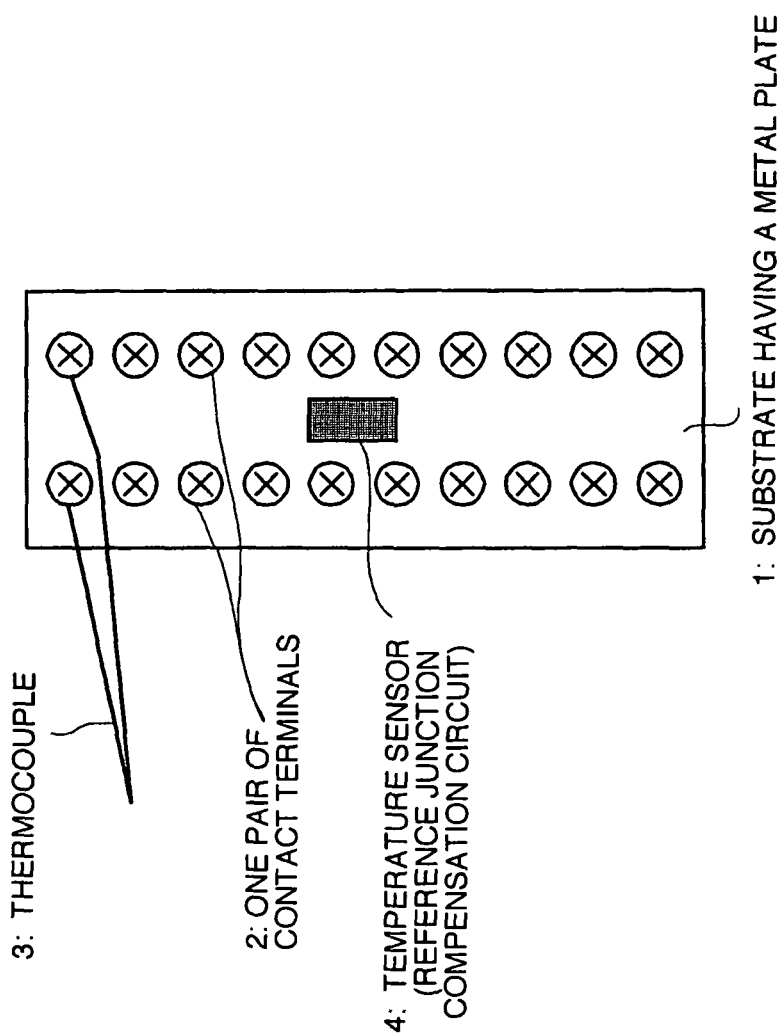
FIG. 7 is a front view showing an example of an input terminal block of a conventional temperature-measuring device.
Figure 8:
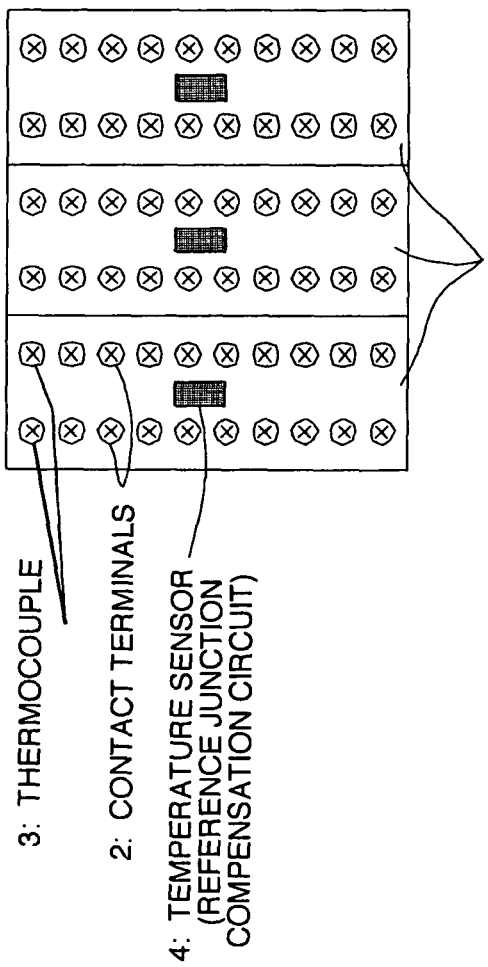
FIG. 8 is a front view showing another example of an input terminal block of a conventional temperature-measuring device.

FIGS. 5, 6 each are a view showing a circuit configuration of a multichannel temperature-measuring device anticipating the case where the temperature sensor will be additionally installed.

Reference numeral 10 denotes a transistor for a temperature sensor, reference numeral 11 denotes a buffer amp, and in FIG. 5, respective terminals (a collector, an emitter, and a base) of the transistor are connected to a connector 15a making up a temperature sensor board 12 while respective terminals (an inverting terminal, a noninverting terminal, and an output terminal) of the buffer amp 11 are connected to a connector 15b making up a measurement circuit board 13. A changeover switch 14 interconnects the inverting terminal, the noninverting terminal and the output terminal.

In FIG. 6, the buffer amp 11 is disposed on a side of the connector 15a, adjacent to the temperature sensor board 12a, so that FIG. 6 differs from FIG. 5 only in respect of on which side of the connector 15a the buffer amp 11 to be used for the temperature sensor board 12 is mounted, adjacent to the temperature sensor board 12, or adjacent to the measurement circuit board 13

In those figures, flow of current from the collector of the transistor 10 will cause a voltage (for example, −0.6 V) associated with a sensor temperature to be developed between the output terminal of the buffer amp 11, and the base, however, with the present invention, in the case of deleting the temperature sensor at the central position, the measurement circuit board 13 is left out while only the temperature sensor board 12 including the transistor 10 is deleted (cost can be reduced to the extent of such deletion).

If the temperature sensor board 12 is deleted, the changeover switch 14 is kept in the ON condition, and if not, the changeover switch 14 is left in the OFF condition. If the changeover switch 14 is turned ON, this will cause the output of the buffer amp 11 to become higher than −0.1 V (about 0 V), so that it is possible to find out whether or not the temperature sensor at the central position is present by use of the flow chart shown in FIG. 4.

With a simple change in hardware, the software is enabled to cope with both cases (the case of reduction in the number of the temperature sensors, and the case of using the temperature sensors as they are) by introducing a novel design idea into the temperature sensor circuit, as described above, and the temperature sensor (denoted by 4a in FIG. 1) that has been deleted prior to delivery from a factory is added depending on user's demand, thereby enabling accuracy of reference junction compensation to be improved.

That is, if a demand for improving the accuracy of the reference junction compensation (demand for simple high-precision measurement, or demand for improvement owing to deterioration in the accuracy of the reference junction compensation, due to usage in an environment of intense variation in an ambient environment) is received from a user after a product has been sold, such a demand can be coped with only by a simple change in the hardware without varying the software.

Further, the temperature sensor board and the changeover switch, shown in FIG. 5 or FIG. 6, are disposed in the interior of the device, where the user cannot usually gain access. Accordingly, it is not possible to alter a decision on whether or not the temperature sensor is to be deleted except for at the time of manufacturing, however, if the circuit described is disposed in part of the device, to which the user can gain access, this will enable the user to change over between deletion and non-deletion by either attaching or detaching the temperature sensor board 12 including the temperature sensor element. In this case, it is necessary to adopt a mechanism wherein only definitely required sensors (the temperature sensor 1, and the temperature sensor 3, shown in FIG. 1) are disposed at positions where the user cannot gain access, or the definitely required sensors are not detachable.

Further, it is to be understood that the foregoing description is intended to simply show particular preferred embodiments of the invention by way of example, and that the invention is therefore not limited thereto, and various changes and modifications may be made therein without departing from the spirit and scope of the invention.

What is claimed is:

1. A temperature-measuring device, comprising:
   a plurality of units of temperature-measurement sets disposed in series, each of the plurality of units including a plurality of thermocouples joined together, each of said plurality of thermocouples including two dissimilar metal wires having ends thereof on one-side joined with each other, and having the other ends thereof connected to one pair of contact terminals, respectively,
   wherein at least one of the plurality of the units of temperature-measurement sets does not include a reference junction compensation circuit and at least another one of the plurality of the units of the temperature-measurement sets includes a reference junction compensation circuit, and
   wherein the reference junction compensation circuit comprises a temperature sensor element and a temperature sensor circuit, and the at least one of the plurality of the units of the temperature measurement sets that does not include a reference junction compensation circuit only includes the temperature sensor circuit and does not include the temperature sensor element.

2. The temperature-measuring device according to claim 1, wherein the plurality of the units of the temperature-measurement sets are formed on one sheet of substrate provided with a metal excellent in thermal conduction.

3. A temperature-measuring device, comprising:
a first unit of a temperature-measurement set, the first unit including
a plurality of thermocouples joined together, each of said plurality of thermocouples including two dissimilar metal wires having ends thereof on one-side joined with each other, and having the other ends thereof connected to one pair of contact terminals, respectively, and
a reference junction compensation circuit; and
a second unit of a temperature-measurement set disposed in series with the first unit of the temperature-measurement set, the second unit including
a plurality of thermocouples joined together, each of said plurality of thermocouples including two dissimilar metal wires having ends thereof on one side joined with each other, and having the other ends thereof connected to one pair of contact terminals, respectively,
wherein the second unit of the temperature-measurement set does not include a reference junction compensation circuit, and
wherein the reference junction compensation circuit comprises a temperature sensor element and a temperature sensor circuit, and the second unit of the temperature measurement set that does not include a reference junction compensation circuit only includes the temperature sensor circuit and does not include the temperature sensor element.

4. A temperature-measuring device, comprising:
at least three units of temperature measurement sets disposed in series, each of the at least three units including a plurality of thermocouples joined together, each of said plurality of thermocouples including two dissimilar metal wires having ends thereof on one-side joined with each other, and having the other ends thereof connected to one pair of contact terminals, respectively,
wherein the units of the temperature measurement sets positioned at respective edges of the temperature measurement device respectively include a reference junction compensation circuit, and at least one of the units of the temperature measurement sets positioned between the units at the respective edges of the temperature measurement device does not include a reference junction compensation circuit, and
wherein the reference junction compensation circuit comprises a temperature sensor element and a temperature sensor circuit, and the at least one of the units of the temperature measurement sets positioned between the units at the respective edges of the temperature measurement device that does not include a reference junction compensation circuit only includes the temperature sensor circuit and does not include the temperature sensor element.

* * * * *